May 26, 1964 H. J. SNOW 3,134,443
DRIVE AND MOUNTING FOR CYCLOIDAL PROPELLER
Filed April 2, 1962 5 Sheets-Sheet 1
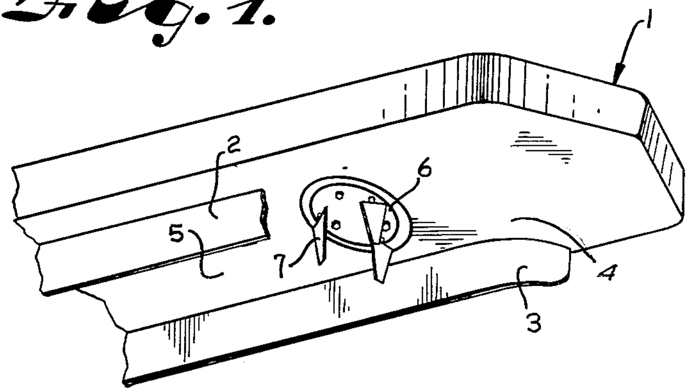
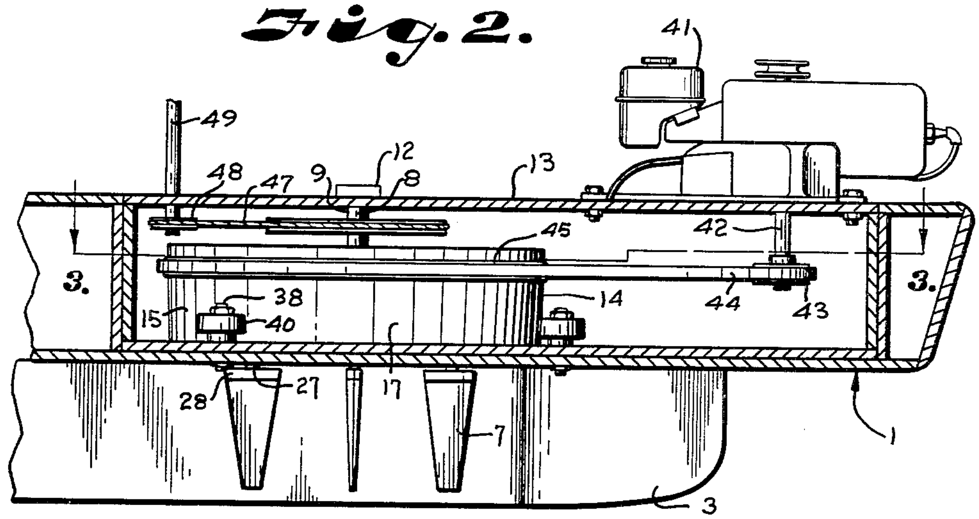
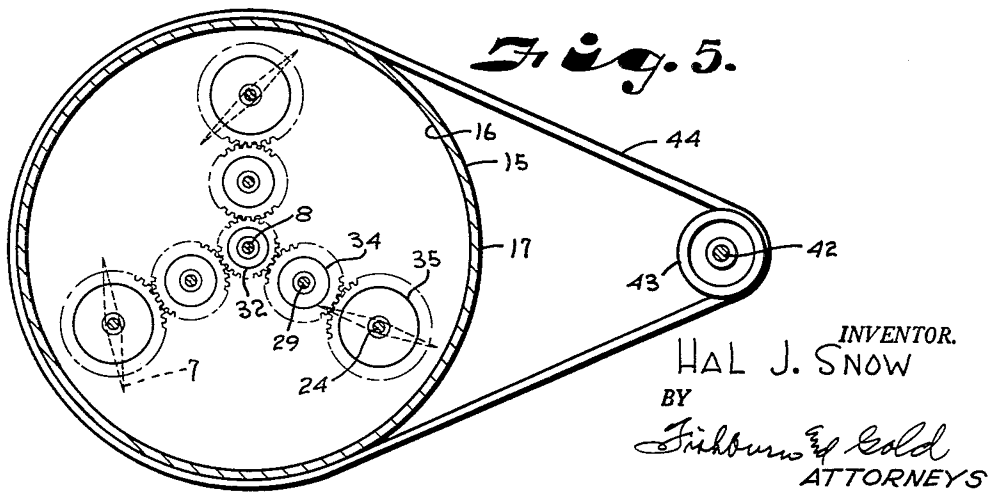
INVENTOR.
HAL J. SNOW
BY
Fishburn & Gold
ATTORNEYS DRIVE AND MOUNTING FOR CYCLOIDAL PROPELLER
Filed April 2, 1962 5 Sheets-Sheet 2
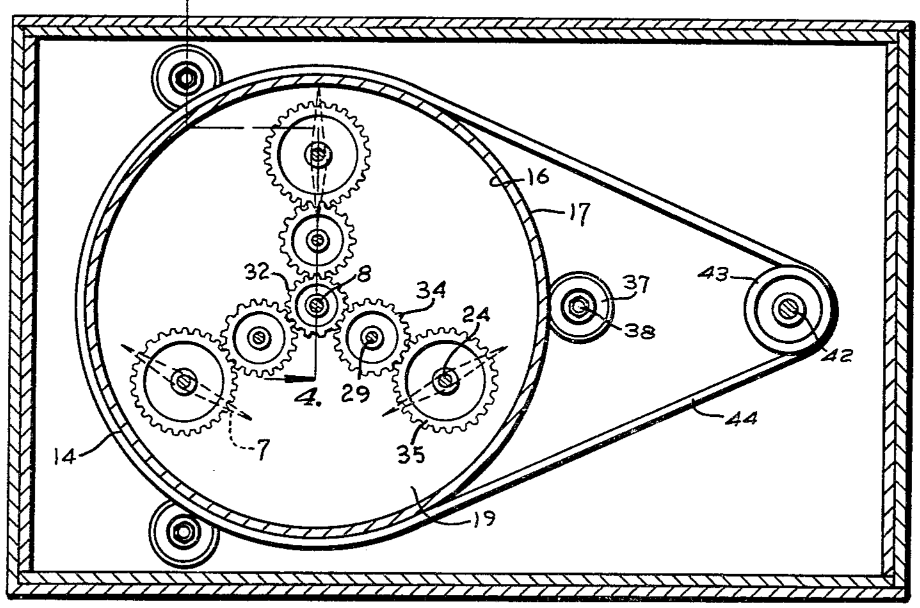
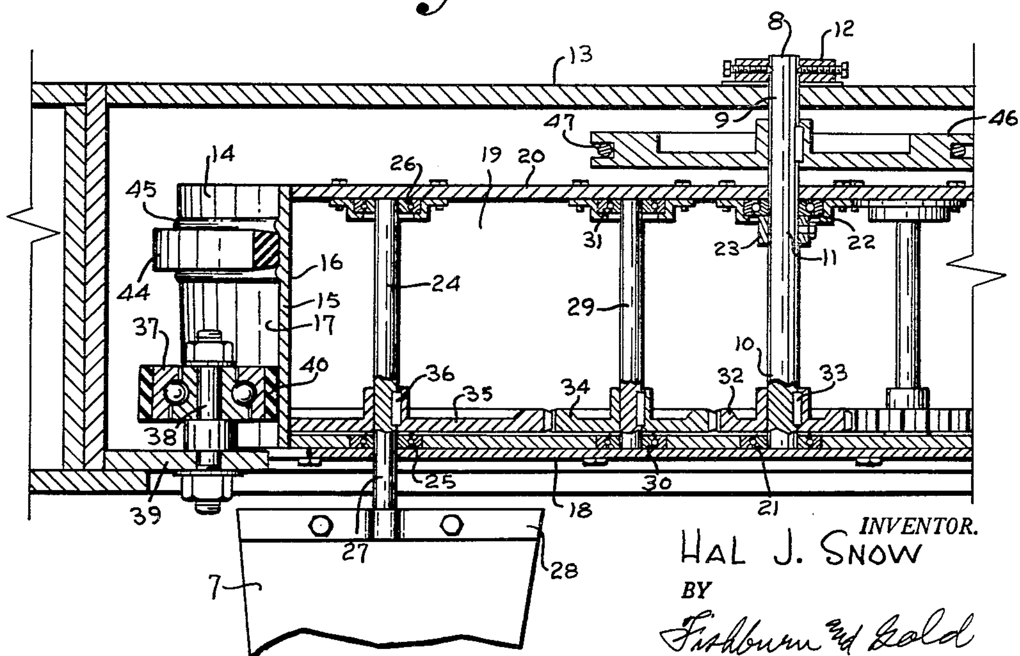
INVENTOR.
HAL J. SNOW
BY
Fishburn and Gold
ATTORNEYS DRIVE AND MOUNTING FOR CYCLOIDAL PROPELLER
Filed April 2, 1962 5 Sheets-Sheet 3
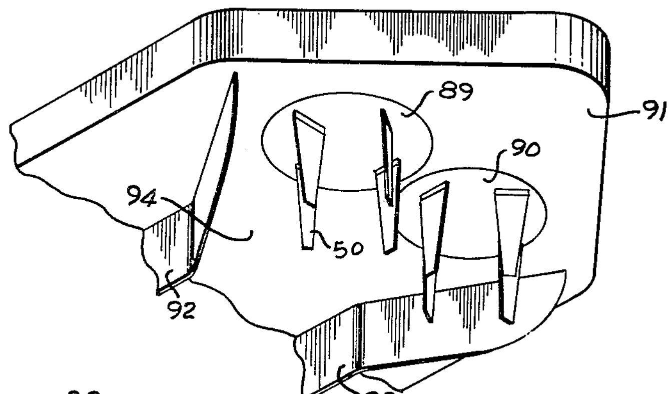
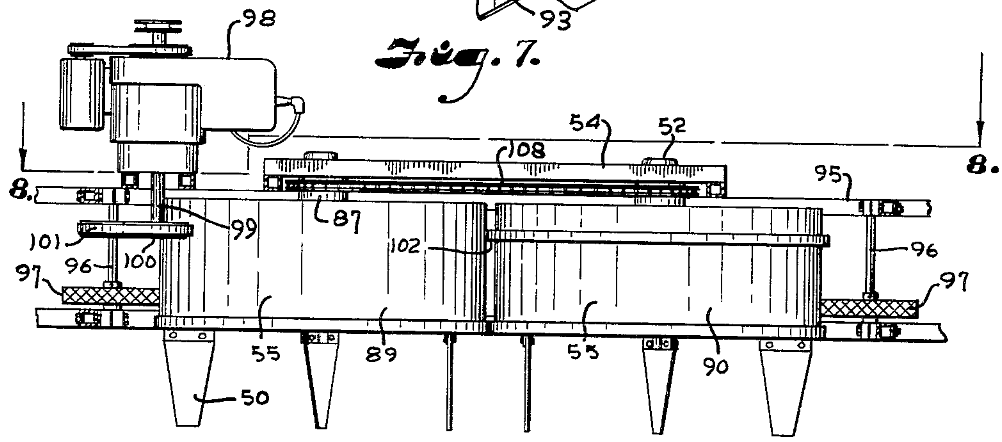
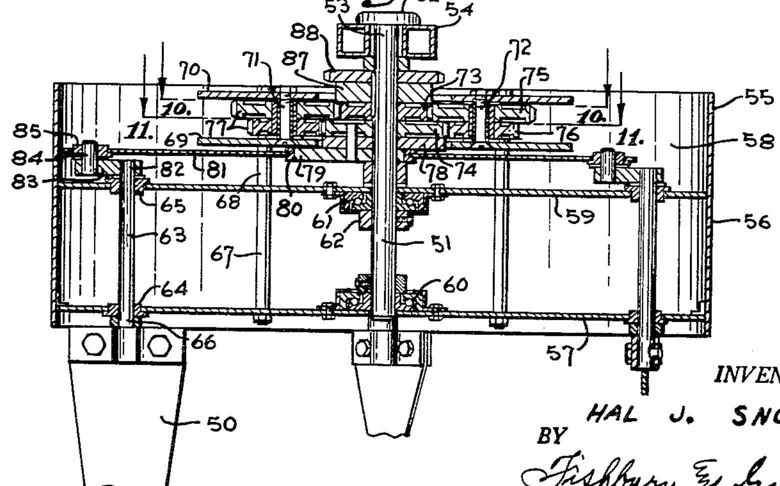
INVENTOR.
HAL J. SNOW
BY
Fishburn & Gold
ATTORNEYS

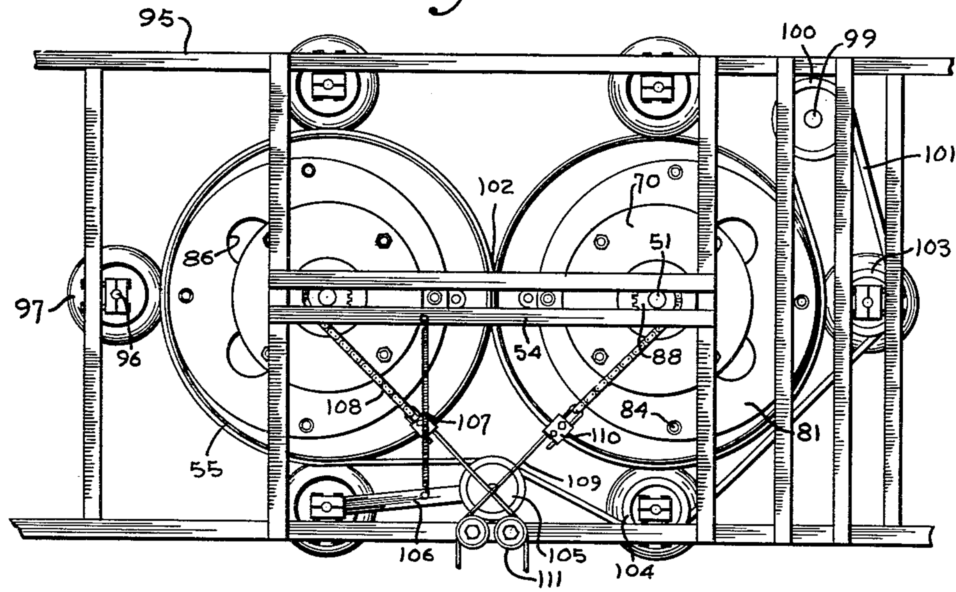
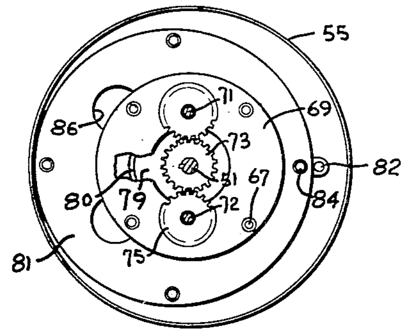
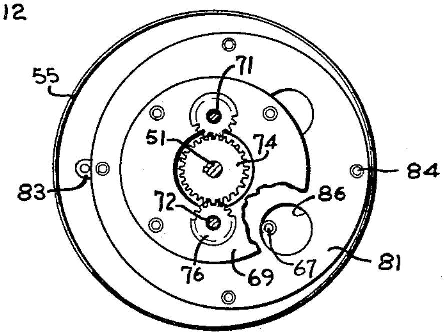
INVENTOR.
HAL J. SNOW
BY
Fishburn & Gold
ATTORNEYS

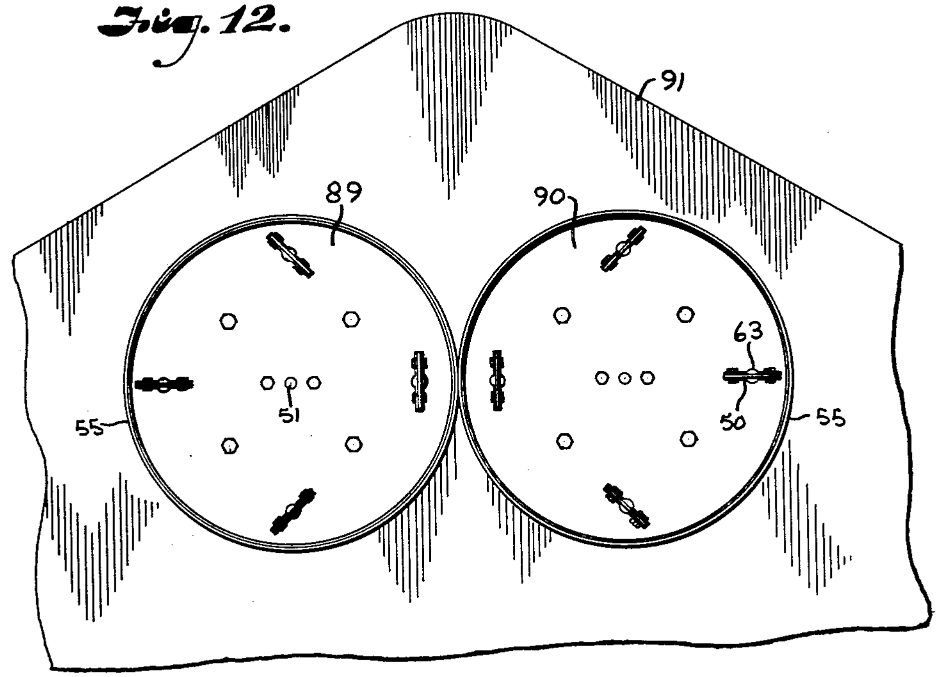
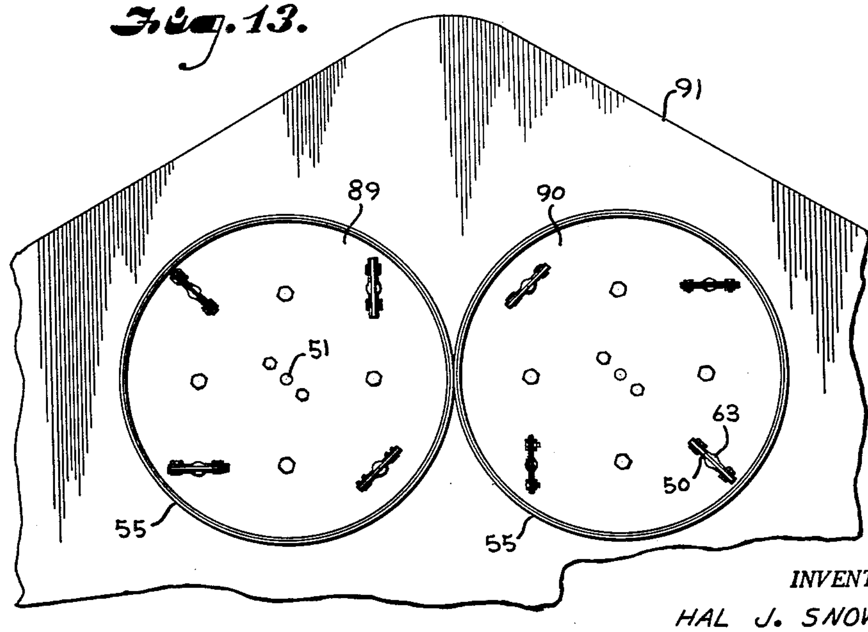
INVENTOR.
HAL J. SNOW
BY
Fishburn & Gold
ATTORNEYS

United States Patent Office 3,134,443

Patented May 26, 1964

3,134,443

DRIVE AND MOUNTING FOR CYCLOIDAL PROPELLER

Hal J. Snow, 2619 S. Hillside, Wichita, Kans.

Filed Apr. 2, 1962, Ser. No. 184,471
5 Claims. (Cl. 170—150)

This application is a continuation-in-part of copending application Serial Number 69,166 filed November 14, 1960. This invention relates to propelling apparatus and more particularly to cycloidal driving and mounting structure for boat propelling paddles.

Cycloidal propellers which can be broadly defined as propellers which rotate about an axis extending transversely of the direction of thrust produced thereby and which have thrust direction control mechanisms enabling the thrust to be altered to various directions transversely of the rotative axis of the propeller. Cycloidal propellers generally include a paddle or blade having a plane in a radial position with respect to the path of movement thereof and a paddle or blade simultaneously in a tangential position in diametrically opposed relation to the radial paddle. To accomplish this the paddles or blades have orbital or angular velocities about a common center equal to twice the rotative velocity about their individual axes whereby each paddle turns about its own axis a half revolution per revolution of the entire propelling mechanism. The direction of thrust produced by a cycloidal propeller may be altered by simultaneously turning in the same direction all the paddles or blades of the propeller through equal angles, and it has heretofore been demonstrated that this may be accomplished without altering either the speed or direction of rotation of the propelling mechanism.

Certain cycloidal propeller installations heretofore have included a pair of side-by-side cycloidal propeller mechanisms referred to as "twin cycloidal propellers." Twin cycloidal propellers provide better symmetry of thrust and improved control characteristics. In such installations the adjacent propeller devices are generally rotated in opposite directions at equal angular velocities.

The driving and mounting mechanisms for inboard marine cycloidal propellers prior hereto have been highly complex and expensive devices making them unsuitable for most light pleasure craft. Outboard cycloidal propeller installations for light water craft have been devised, however, they have also involved relatively complex mounting and driving structures and required paddle operation at great water depth so as to obtain propulsion without excess disturbance and efficiency loss at the water surface. In addition, the deeply submerged paddles resulted in a craft which was unsuitable for shallow water.

The principal objects of the present invention are: to provide a drive and mounting structure for cycloidal propellers which is of simple construction and yet permits inboard water craft installation; to provide such a device wherein the paddles or blades may be located between the hulls of a twin-hulled boat and extend downwardly to a depth not greater than the maximum depth of the hulls; to provide such a device wherein a housing or drum which contains paddle-driving shafts and gears is driven through contact with the outside surface thereof; to provide a cycloidal propeller driving structure wherein a drum or housing containing the gears and shafts essential thereto is vertically supported solely by a central shaft through which output thrust direction may be controlled; to provide such a cycloidal propeller housing which is laterally supported by a plurality of rotatable horizontal wheels or the like maintained in contact with the outer surface thereof; to provide a twin cycloidal propeller installation wherein two cycloidal propellers are maintained in side-by-side relation and provide lateral support for each other and having a single serpentine drive belt extending therebetween; to provide a drive and mounting for cycloidal propellers which includes an eccentric cam adapted to rotate about a central shaft and drive a plate in an eccentric motion about the central shaft, which plate drives cranks connected to vertically extending shafts for rotating the paddles at speeds relative to the speed of housing rotation; to provide a drive and mounting for cycloidal propellers which includes a plurality of planetary gears rotatably mounted on and within a revolving housing and intermeshed for rotating propelling paddles in synchronization with, but at one-half the angular velocity of, the housing; and to provide such a drive and mounting for cycloidal propellers which is simple in construction, inexpensive to build, easily maintained and highly desirable for its intended purpose.

Other objects and advantages of this invention will become apparent from the following description taken in connection with the accompanying drawings wherein are set forth by way of illustration and example certain embodiments of this invention.

FIG. 1 is a fragmentary perspective view of a single cycloidal propelling structure embodying this invention mounted inboard on a boat in the throat formed by flow directing members.

FIG. 2 is a longitudinal cross-sectional view through the boat of FIG. 1 in side elevation showing portions of the mounting and driving structure for the propelling device.

FIG. 3 is a cross-sectional view through the propelling structure taken on the line 3—3 of FIG. 2 showing the planetary gearing and housing drive with the paddle positions illustrated in broken lines.

FIG. 4 is a cross-sectional fragmentary view taken on the line 4—4 of FIG. 3 showing details of the supporting and steering structure of the propelling device.

FIG. 5 is a fragmentary view showing in broken lines the paddles of the propelling device rotated 45° from the forward drive position illustrated in FIG. 3.

FIG. 6 is a fragmentary perspective view of a boat having hull members forming a throat at the rear thereof and twin cycloidal propelling devices embodying this invention mounted inboard on the boat with the paddles in the throat.

FIG. 7 is a fragmentary view in side elevation showing portions of the mounting structure for the propelling devices of FIG. 6.

FIG. 8 is a cross-sectional view taken on the line 8—8 of FIG. 7 showing the twin propelling devices from the top and the frame supporting structure therefor.

FIG. 9 is a cross-sectional view taken through a modified cycloidal propelling device embodying this invention showing an eccentrically driven plate contained within the device housing and adapted to drive paddles about their own axes.

FIG. 10 is a cross-sectional view taken on the line 10—10 of FIG. 9 showing upper planetary gears meshed with a center gear fixed to a center support shaft.

FIG. 11 is a cross-sectional view through the propelling device taken on a line 11—11 of FIG. 9 showing a second set of planetary gears meshed with a gear rotatable with respect to the center support shaft.

FIG. 12 is a fragmentary bottom view showing the twin propelling devices adjusted for forward craft propulsion.

FIG. 13 is a bottom view showing the twin propelling devices adjusted for a boat turning position.

Referring to the drawings in more detail:

The reference numeral 1 generally indicates a water craft of the type adapted for use in very shallow water. The craft 1 has a pair of downwardly extending and rearwardly outwardly tapering hulls or flow directing members 2 and 3 forming a throat 4 adjacent the rear of the boat. The members 2 and 3 are laterally spaced and extend longitudinally of the craft 1 forming a water passageway or channel 5 therebetween through which water may be urged rearwardly in propelling the craft forwardly. A cycloidal propelling device 6 is mounted in the throat 4 inboard of the boat 1 and has a plurality of planar propelling paddles 7 extending downwardly therefrom, in the illustrated example, three of such paddles being shown. The paddles 7, through mechanism described hereinafter, have orbital angular velocities equal to twice the rotative velocities about their own axes so that each paddle turns about its own axis one-half revolution per revolution of the device.

Referring to FIGS. 2 to 5, the driving and mounting structure for the paddles 7 comprises a normally stationary vertically extending center shaft 8 having an upper portion 9 and a lower portion 10 and an intermediate portion broadly designated 11. A mounting sleeve or ring 12 is rigidly secured to the upper portion 9 of the center shaft 8 and rotatably bears against the upper frame deck 13 of the craft for rotatably and longitudinally supporting the center shaft 8 in a downwardly suspended condition.

A housing 14 includes a vertically extending cylindrical side wall 15 having an inside surface 16 and an outside surface 17. A horizontally extending bottom drum head or bottom wall 18 is fixed to the side wall 15 and defines therewith a cylindrical chamber 19 within the housing 14. A horizontally extending drum head or support wall 20 is spaced above the bottom wall 18 and is fixed to the side wall 15, substantially enclosing the cylindrical chamber 19. The center shaft 8 extends co-axially downwardly into the cylindrical chamber 19 and through the support wall 20, FIG. 4.

A lower bearing 21 and an upper bearing 22 are respectively secured to the bottom wall 18 and the support wall 20 in aligned relationship and respectively engage the center shaft 8 adjacent the lower portion 10 and intermediate portion 11 thereof. The bearings 21 and 22 mount the center shaft for rotation with respect to the housing 14. A collar 23 is fixed to the center shaft 8 adjacent the intermediate portion 11 hereof and engages the upper bearing 22 for suspending the housing 14 by the center shaft 8.

A plurality of vertically extending drive shafts 24, in the illustrated example three in number corresponding to the paddles 7, are positioned in the chamber 19 and are circumferentially and radially equally spaced on a circle about the center shaft 8. Aligned bearings 25 and 26 are respectively secured to the bottom wall 18 and the support wall 20 for rotatably and axially supporting the drive shafts 24. A lower portion 27 of each of the drive shafts 24 projects downwardly past the bottom wall 18 and the respective paddles 7 are suitably secured thereto, in the illustrated example by means of clamp members 28. The paddles 7 are arranged with respect to each other so that the planes thereof converge at a point in the known manner and the paddles maintain this relationship regardless of the various angular positions assumed thereby.

A plurality of vertically extending intermediate shafts 29 are rotatably mounted in the housing 14 within the cylindrical chamber 9 by means of bearings 30 and 31 which are aligned with each other and are respectively mounted on the bottom wall 18 and support wall 20. The intermediate shafts 29 are located in positions between and spaced from the center shaft 8 and the mounting circle of the drive shafts 24, in the illustrated example, on radial lines extending therebetween. A center gear 32 is mounted co-axially on the center shaft 8 and is rotatably fixed with respect thereto by means of a suitable shaft key 33. An intermediate gear 34 is mounted on each of the intermediate shafts 29 and the intermediate gears 34 are respectively meshed with the center gear 32, forming idler gears located in planetary fashion therearound. A drive gear 35 is rotatably fixed by means of a shaft key 36 to each of the drive shafts 24 and meshes respectively with each of the intermediate gears 34. The gear train ratio between the center gear 32 and the respective drive gears 35 are 2 to 1 whereby the drive gears 35 are adapted to rotate in the same direction but with one-half the angular velocity as the rotation or angular velocity generated by rotating the housing 14, as described hereinafter, about the center shaft 8.

Three wheels 37 are rotatably mounted on vertically extending stud shafts 38 which are fixed to the supporting structure 39 surrounding the cycloidal propelling device. The wheels 37 have an outer shell or surface 40 preferably of a resilient, quiet running material such as rubber which is maintained in contact with the outside surface 17 of the housing 14. The wheels 37, in the illustrated example, are located 120° from each other and provide lateral support for the housing 14 while permitting free rotation thereof about the center shaft 8.

A suitable prime mover, in the illustrated example a gasoline engine 41, has an output shaft 42 rigidly supporting a pulley 43 for rotation therewith. The pulley 43 is spaced from the housing 14 and has a drive belt 44 engaged therewith and also with the outside surface 17 of the housing 14 above the wheels 37. In the illustrated example, a pair of circumferential vertically spaced ridges 45 are formed on the outside surface 17 of the housing 14 for mantaining the drive belt 44 in a desired aligned position with respect to the pulley 43. It is to be understood that the rotation of the pulley 43 causes the housing 14 to rotate about the normally stationary center shaft 8, which rotation causes the gears 34 and 35 to orbit about the center gear 32 causing a rotation of the drive shafts 24 about their own axes as they orbit about the center shaft. As noted above, the drive shafts 24 and the respective paddles 7 rotate in the same direction but at one-half the angular velocity of the housing 14 about the center shaft 8.

A pulley 46 is rotatably fixed to the center shaft 8 between the support wall 20 and the upper support deck 13. A suitable driving cable 47 is engaged with the pulley 46 and is also engaged with a pulley 48 fixed to a shaft 49 which extends upwardly through the deck 13 and terminates in a suitable steering device such as a hand wheel (not shown). When the shaft 49 is rotated, the center shaft 8 is rotated independently of the housing 14. It is to be understood that such a rotation of the center shaft 8 causes each of the paddles 7 to rotate through an equal angle which causes an alteration in the phase of the paddles with respect to the water craft and results in a net change in the direction of propulsion, thus providing steering for the craft.

A modified embodiment of this invention is illustrated in FIGS. 9, 10 and 11 wherein the driving structure for propelling planar paddles 50 comprises a normally stationary vertically extending center shaft 51 having a sleeve or ring 52 fixed to the upper end 53 thereof and rotatably engaged with suitable supporting beams 54 for rotatably and longitudinally supporting the center shaft in a suspended condition. A housing 55 includes a vertically extending cylindrical side wall 56 having a horizontally extending bottom wall 57 fixed thereto and defining therewith a cylindrical chamber 58 within the housing 55. A horizontally extending support wall 59 is spaced above the bottom wall 57 and is fixed to the side wall 56. The center shaft 51 extends co-axially downward into the chamber 58 and through the support wall 59. Lower and upper vertically aligned bearings 60 and 61 are respectively secured to the bottom wall 57 and support wall 59 and respectively engage the center shaft 51 for rotatably mounting the center shaft with respect to the housing 55. A collar 62 is fixed to the center shaft 51 and engages the upper bearing 61 for supporting the housing 55 by the center shaft 51.

A plurality of vertically extending drive shafts 63, in the illustrated example four in number, are contained in the chamber 58 and are circumferentially and radially equally spaced on a circle about the center shaft 51. Aligned bearings 64 and 65 are respectively secured to the bottom wall 57 and support wall 59 for rotatably and axially supporting the drive shafts 63. The lower portion 66 of each of the drive shafts 63 projects downwardly past the bottom wall 57 and has the paddles 50 respectively secured thereto. A plurality of spaced support posts 67 are respectively rigidly secured to the bottom wall 57 and support wall 59 and have portions 68 extending above the support wall 59. A pair of vertically spaced annular plates 69 and 70 are rigidly supported with respect to the housing 55 on the support post portions 68. A pair of vertically extending intermediate shafts 71 and 72 are oppositely disposed from the center shaft 51 and are rigidly supported between the plates 69 and 70. The intermediate shafts 71 and 72 are rigidly supported with respect to the housing 55 between and spaced from the center shaft 51 and the mounting circle of the drive shafts 63. A first center gear 73 is co-axially fixed to the center shaft 51 and a second center gear 74 is co-axially but rotatably mounted on the center shaft 51 and positioned below the first center gear 73. A first intermediate gear 75 is co-axially and rotatably mounted on each of the intermediate shafts 71 and 72 and meshed with the first center gear 73. A second intermediate gear 76 is co-axially and rotatably mounted on each of the intermediate shafts 71 and 72 and is meshed with the second center gear 74. The first and second intermediate gears 75 and 76 are rotatably fixed with respect to each other whereby they rotate simultaneously and form planetary clusters 77 respectively adapted to orbit about the center shaft 51 while simultaneously rotating about their own axes in response to a relative rotation between the center shaft 51 and the housing 55. The gear train ratio through the gears 73, 74, 75 and 76 in the illustrated example is 2:1 whereby the second center gear 74 rotates in the same direction but with one-half the angular velocity as the rotation or angular velocity between the housing 55 and the center shaft 51.

A spacer 78 is rotatably fixed to the under side of the center center gear 74 and a circular horizontally extending eccentric cam 79 is rotatably fixed to and beneath the second center gear 74 and spacer 78. The cam 79 is adapted to rotate about the center shaft 51 with the second center gear 74. A follower ring 80 is slidably engaged with the peripheral surface of the cam 79 and is secured to a horizontally extending spider or drive plate 81. The drive plate 81 has a diameter smaller than the diameter of the cylindrical chamber 58 for a purpose apparent hereinafter.

An upper portion 82 of each of the drive shafts 63 projects upwardly through the support wall 59 and a plurality of horizontally extending crank arms 83 are respectively secured thereto and rest on the bearings 65. A vertically extending pin 84 is secured to each of the crank arms 83 an equal distance from the respective drive shaft 63. Spaced bearings 85 are mounted on the drive plate 81 for pivotally engaging the respective pins 84 and vertically supporting the drive plate on the crank arms 83. The crank arms 83 extend parallel to each other and in a common direction laterally of the respective vertical drive shaft 63 to which they are attached.

The spider or drive plate 81 has a plurality of circular openings 86 extending therethrough in the vicinity of the support posts 67 whereby the plate 81 may move in a restricted circular or cranking motion about the drive shafts 63 without contacting or otherwise interfering with the support posts 67.

A spacer 87 rests against the upper surface of the first center gear 73 and a sprocket wheel 88 is rotatably fixed to the center shaft 51 and rests on the spacer 87.

The sprocket wheel 88 acts as a steering device as described hereinafter for altering simultaneously the angular attitude or phase of the paddles 50 with respect to the rotational phase of the housing 55. It is to be understood that the rotation of the housing 55 with respect to the center shaft 51 causes the spider or drive plate 81 to drive the drive shafts 63 simultaneously with the crank arms 83 and thus rotates the respective paddles 50 about their own axes as they orbit about the center shaft 51. The rotation of the sprocket wheel 88 with respect to the craft frame supporting beams 54 will simultaneously alter the angle of the paddles 50 with respect to the rotational phase of the housing 55 to change the net direction of propulsion for steering the craft.

It is sometimes desirable to mount cycloidal propelling devices in side-by-side relationship to provide better propelling and steering symmetry. With respect to the instant invention, a pair of cycloidal propelling devices designated 89 and 90 are mounted in side-by-side relationship inboard on a water craft 91, FIG. 6. Downwardly extending flow directing members 92 and 93 taper outwardly from each other as they extend rearwardly of the craft 91 forming a throat 94 therebetween within which the propelling devices 89 and 90 are mounted. A frame structure 95 which may be an integral part of the craft 91 provides support for the devices 89 and 90. In the illustrated example (FIG. 8), the frame structure 95 includes the supporting beams 54 for providing vertically suspending support for the center shaft 51 and housing 55 as shown in the embodiment of FIG. 9; however, the embodiment of FIG. 4 is also adaptable for twin mounting. Referring to FIG. 8, vertically extending shafts 96 are rigidly secured to the frame 95 and rotatably support wheels 97 in contact with the housing 55 of the respective propelling devices 89 and 90. The wheels 97 contact the respective housing 55 at points separated 90° from each other and on center lines extending longitudinally of the boat and through the respective center shafts 51 and on a center line extending laterally of the boat and through the respective center shafts 51, but are not present at the point of closest separation between the two housings 55, FIG. 8.

A suitable prime mover such as an internal combustion gasoline engine 98 is secured to the frame structure 95 and has an output shaft 99 with a pulley 100 fixed thereto. The pulley 100 is engaged with a drive belt 101 which is engaged with the outer surface of the respective housings 55 in serpentine or S fashion whereby the driving of the belt urges the respective housings simultaneously in opposite directions. The point of closest separation between the respective side walls 56 is designated 102 and the drive belt 101 at this point contacts both the housings 55 whereby the respective housings provide lateral support for each other in the direction of closure therebetween, thus eliminating the need for a pair of the wheels 97 therebetween. Suitable idler pulleys 103 and 104 are rotatably mounted on suitable wheel shafts 96 secured to the frame 95 for directing the drive belt 101 in a desired path for completing the transit against and between the housings 55. A suitable idler pulley 105 is rotatably mounted on an arm 106 which is in turn pivotally mounted on a wheel shaft 96 and urged in a counter-clockwise direction by a tension spring 107. The idler pulley 105 engages the drive belt 101 for maintaining the desired tension thereon to provide efficient frictional engagement with the housings 55 and the driving pulley 100.

Simultaneous steering of the propelling devices 89 and 90 is accomplished by engaging the sprockets 88 on the respective devices by a single chain 108 which extends therebetween and meshes therewith. The opposite ends of the chain 108 are respectively connected to the opposite ends of a flexible cable 109 by suitable fasteners 110. The ends of the cable 109 are crossed and engaged with guide pulleys 111 rotatably mounted on the frame structure 95 and the cable 109 is then fastened to suitable mechanism for moving the cable ends simultaneously in longitudinally opposite directions, in the illustrated example, a steering wheel shaft 112. It is to be understood that the rotation of the steering wheel shaft 112 causes an equal angular variation in the same direction of the center shaft 51 with respect to the craft 91 thus changing the direction of propulsion equally with respect to both the propelling devices 89 and 90 for steering the craft.

It is noted that in light, low horsepower structures, the lateral support wheels such as 37 and 97 may be eliminated and lateral as well as vertical support furnished by the center shafts.

It is to be understood that while certain forms of this invention have been illustrated and described, the invention is not to be limited to the specific form or arrangement of parts herein described and shown except insofar as such limitations are included in the claims.

What I claim and desire to secure by Letters Patent is:

1. Cycloidal driving and mounting structure for boat propelling paddles comprising:

(*a*) a normally stationary vertically extending center shaft, (*b* means cooperating with said center shaft for rotatably and longitudinally supporting said center shaft in a suspended condition, (*c*) a housing including a vertically extending cylindrical side wall having an outside surface and defining a chamber within said housing, (*d*) said center shaft extending co-axially of said side wall and downwardly into said chamber, (*e*) means for rotatably mounting said housing with respect to said center shaft, means for suspending said housing by said center shaft, (*f*) plurality of vertically extending drive shafts in said chamber and circumferentially and radially equally spaced on a circle about said center shaft, means for rotatably and axially supporting said drive shafts in said chamber, (*g*) a lower portion of each of said drive shafts projecting downwardly past said side wall and having said paddles respectively secured thereto, (*h*) a center gear fixed co-axially to said center shaft, an intermediate gear for each of said drive shafts, means for rotatably mounting said intermediate gears on said housing and meshing with said center gear, (*i*) a drive gear operatively connected to each of said drive shafts and meshing respectively with said intermediate gears, (*j*) the gear train ratio between said center gear and said drive gear being 2 to 1 whereby said drive shafts are adapted to rotate in the same direction and with one-half the angular velocity as the relative angular velocity between said housing and said center shaft, (*k*) a plurality of rotatable lateral support wheels circumferentially spaced around said housing and engaging said side wall outside surface, (*l*) a pulley spaced from said housing, means for driving said pulley, (*m*) a drive belt engaging said side wall outside surface and said pulley for rotating said housing, and (*n*) means for rotating said center shaft to vary the rotational phase of said paddles with respect to the rotational phase of said housing.

2. Cycloidal driving and mounting structure for boat propelling paddles comprising:

(*a*) a normally stationary vertically extending center shaft, (*b*) means for longitudinally supporting said center shaft in a suspended condition, (*c*) a housing including a vertically extending cylindrical side wall defining a chamber within said housing, (*d*) said center shaft extending co-axially of said side wall and downwardly into said chamber, (*e*) means for rotatably mounting said housing with respect said center shaft and in suspended relation, (*f*) a plurality of lateral support means engaging a lower portion of the housing side wall at circumferentially spaced points, (*g*) a plurality of vertically extending drive shafts in said chamber and spaced about said center shaft, (*h*) a lower portion of each of said drive shafts projecting downwardly past said side wall, (*i*) a boat propelling paddle secured to said lower portion of each drive shaft, (*j*) power transmission means in said chamber and operatively connecting each of said drive shafts with said center shaft, said power transmission means having a speed ratio of two to one whereby said drive shafts are adapted to rotate with one-half the angular velocity as the relative angular velocity between said housing and said center shaft, (*k*) said power transmission means including at least one vertically extending intermediate shaft, means for supporting said intermediate shaft on said housing and spaced from said center shaft, (*l*) a first center gear co-axially fixed to said center shaft, a second center gear co-axially rotatably mounted on said center shaft and positioned below said first gear, (*m*) a first intermediate gear co-axially mounted on said intermediate shaft and meshed with said first center gear, a second intermediate gear co-axially mounted on said intermediate shaft and meshed with said second center gear, (*n*) said first and second intermediate gears being rotatably fixed with respect to each other and rotatable about their axes and forming a planetary cluster adapted to orbit about said center shaft in response to a relative rotation between said center shaft and said housing, (*o*) a horizontally extending eccentric cam fixed to and beneath said second center gear and adapted to rotate with said second gear about said center shaft, (*p*) a follower ring slidably engaged with said cam, a horizontally extending drive plate secured to said follower ring and being smaller in width than said chamber, (*q*) a crank arm secured to each of said drive shafts, (*r*) a vertically extending pin secured to each of said crank arms and rotatably engaging said drive plate for driving said drive shafts, (*s*) and means engaging said side wall for rotating said housing.

3. Cycloidal driving and mounting structure for boat propelling paddles comprising:

(*a*) a normally stationary vertically extending center shaft, (*b*) means for longitudinally supporting said center shaft in a suspended condition, (*c*) a housing including a vertically extending cylindrical side wall defining a chamber within said housing, (*d*) said center shaft extending co-axially of said side wall and downwardly into said chamber, (*e*) means for rotatably mounting said housing with respect to said center shaft and in suspended relation, (*f*) a plurality of lateral support means engaging a lower portion of the housing side wall at circumferentially spaced points, (*g*) a plurality of vertically extending drive shafts in said chamber and spaced about said center shaft, (*h*) a lower portion of each of said drive shafts projecting downwardly past said side wall, (*i*) a boat propelling paddle secured to said lower portion of each drive shaft, (*j*) power transmission means in said chamber and operatively connecting each of said drive shafts with said center shaft, said power transmission means having a speed ratio of two to one whereby said drive shafts are adapted to rotate with one-half the angular velocity as the relative angular velocity between said housing and said center shaft, (*k*) said power transmission means including at least one vertically extending intermediate shaft, means for supporting said intermediate shaft on said housing and spaced from said center shaft, (*l*) a first center gear co-axially fixed to said center shaft, a second center gear co-axially rotatably mounted on said center shaft, (*m*) a first intermediate gear co-axially mounted on said intermediate shaft and meshed with said first center gear, a second intermediate gear co-axially mounted on said intermediate shaft and meshed with said second center gear, (*n*) said first and second intermediate gears being rotatably fixed with respect to each other and rotatable about their axes and forming a planetary cluster adapted to orbit about said center shaft in response to a relative rotation between said center shaft and said housing, (*o*) a horizontally extending eccentric cam fixed to said second center gear and adapted to rotate with said second gear about said center shaft, (*p*) a drive plate slidably engaged with said cam, said drive plate being smaller in horizontal width than said chamber, (*q*) a crank arm secured to each of said drive shafts, (*r*) a vertically extending pin secured to each of said crank arms and rotatably engaging said drive plate for driving said drive shafts, (*s*) and means engaging said side wall for rotating said housing.

4. Cycloidal driving and mounting structure for boat propelling paddles comprising:

(*a*) a support member, (*b*) a normally stationary vertically extending center shaft having an upper portion, (*c*) means mounting said upper portion of the center shaft on said support member with said shaft depending therefrom in suspended condition, (*d*) a housing including a vertically extending cylindrical side wall portion, said housing having a chamber therein partially defined by said cylindrical side wall portion, (*e*) said center shaft extending co-axially of said side wall portion and downwardly into said chamber, (*f*) means for rotatably mounting said housing with respect to said center shaft and in suspended relation relative thereto, (*g*) a plurality of rollers mounted on said support member with each of said rollers rotatable on substantially vertical axes and having peripheries engaging the periphery of the side wall of the housing at circumferentially spaced points and spaced substantially below the suspending mounting of said center shaft for resisting lateral forces and cooperating with the suspending mounting of the housing for rotation on the axis of the center shaft, (*h*) a plurality of vertically extending drive shafts in said chamber and spaced about said center shaft, (*i*) a lower portion of each of said drive shafts projecting downwardly past said side wall, (*j*) a boat propelling paddle secured to said lower portion of each drive shaft, (*k*) power transmission means in said chamber and operably connecting each of said drive shafts with said center shaft, said power transmission means having a speed ratio of two to one whereby said drive shafts are adapted to rotate with one-half the angular velocity as the relative angular velocity between said housing and said center shaft, (*l*) power means having a driven pulley spaced from said housing, (*m*) and a drive belt operatively engaged with said driven pulley and the periphery of the housing side wall for rotating said housing.

5. Cycloidal driving and mounting structure for boat propelling paddles as set forth in claim 4 wherein the means mounting the upper portion of the center shaft on the support member is a rotatable mounting for rotation of said shaft on its axis, and including means operatively connected to said center shaft for rotating same to vary the rotational phase of said paddles with respect to the rotational phase of said housing.

References Cited in the file of this patent

UNITED STATES PATENTS

| | | |
|---|---|---|
| 453,180 | Edson | June 2, 1891 |
| 913,787 | Vojacek | Mar. 2, 1909 |
| 1,033,827 | Pearson | July 30, 1912 |
| 1,363,615 | Paulsen et al. | Dec. 28, 1920 |
| 1,681,500 | Schneider | Aug. 21, 1928 |
| 1,922,606 | Voith | Aug. 15, 1933 |
| 2,585,502 | Schneider | Feb. 12, 1952 |
| 2,678,019 | Couch | May 11, 1954 |

FOREIGN PATENTS

| | | |
|---|---|---|
| 926,290 | France | Apr. 14, 1947 |
| 698,055 | Germany | Oct. 31, 1940 |